Figure 1:
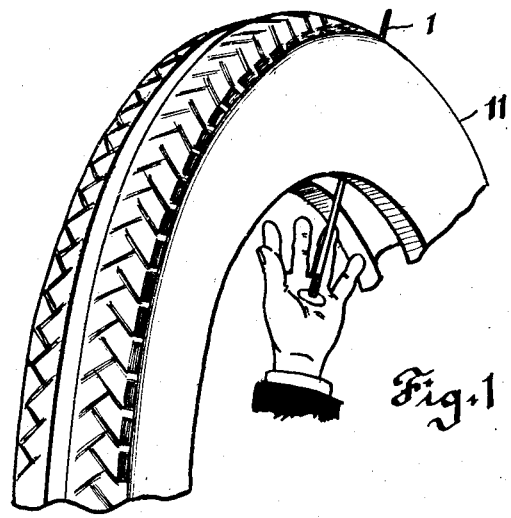

Jan. 19, 1926.

A. H. FISHER

METHOD AND MEANS FOR REPAIRING TIRE CASINGS

Filed Jan. 28, 1925

1,570,298

Albert H. Fisher, INVENTOR.

BY

Fay, Oberlin & Fay,
ATTORNEYS

Patented Jan. 19, 1926.

1,570,298

UNITED STATES PATENT OFFICE.

ALBERT H. FISHER, OF EAST CLEVELAND, OHIO, ASSIGNOR OF ONE-HALF TO MILAN R. FORKAPA.

METHOD AND MEANS FOR REPAIRING TIRE CASINGS.

Application filed January 28, 1925. Serial No. 5,259.

*To all whom it may concern:*

Be it known that I, ALBERT H. FISHER, a citizen of the United States, and a resident of East Cleveland, county of Cuyahoga, and State of Ohio, have invented a new and useful Improvement in Methods and Means for Repairing Tire Casings, of which the following is a specification, the principle of the invention being herein explained and the best mode in which I have contemplated applying that principle, so as to distinguish it from other inventions.

This invention, as indicated, relates to a method and means for repairing the casing of an automobile tire. More particularly it comprises the method of spreading apart the walls about a puncture hole through an automobile tire casing, and while maintaining such walls so compressed or expanded, shielding and compressing the stem of a puncture plug and drawing the same past the compressed portion of said casing, and releasing progressively into self-conforming relation the compressed wall area about the puncture hole and the compressed body of the puncture plug stem. The invention also comprises an instrument in the form of a tapered needle adapted to co-operate with a mushroom-shaped rubber plug, the stem of which is adapted to be received within a socket formed at the lower end of said needle, with the head of said plug bearing against the base of said needle whereby said device may be forced through a nail hole or similar opening through the casing of an automobile tire from the inner side thereof, until the inner face of the head of said plug bears against the inner wall of said tire casing. The needle may then be disengaged from said plug and withdrawn upon the outer side of the casing. The stem of the plug will thus be firmly engaged within the perforation through the casing and the head of the plug will be held in close contact with the adjacent inner wall of the casing. The casing will thus be tightly sealed against ingress of sand or other foreign material through the perforation, as would be the consequence of leaving such opening unrepaired.

It is the usual practice, when a tire has been perforated, to leave the puncture aperture unrepaired if of small size, and to apply a patch to the interior of the casing and vulcanize the same in place if an opening of considerable size was formed through the casing. Such repair by means of a patch still leaves a passageway through the casing from the exterior face thereof to the inner surface of the patch and the alternate flexing and deformation of the casing wall, as the tire comes into contact with the road surface and rotates free thereof, produces a pinching action in the casing walls adjacent the aperture produced by the nail or other puncture-forming instrument and works small particles of dirt and grit from the road surface toward the inner wall of the casing. Water also enters the opening and in the course of time the grit comes into contact with the inner face of the patch and is diverted laterally, forming at first a "sand blister" which subsequently results in a "blow-out." Similar action occurs against the inner tube when no patch is applied to the inner face of the casing, and in addition, the inner tube is forced into the inner end of said aperture and is directly subjected to a pinching action. After one puncture it not infrequently occurs that a second leak will develop in the inner tube at the puncture point, due to this pinching action of the casing wall.

It has heretofore been proposed, particularly in connection with the quick repair of single tube bicycle tires, to force a soft rubber plug from the exterior of the tire through the puncture opening, or an enlargement thereof. In most instances it was found necessary to enlarge the original puncture through the tire before the insertion of the plug and then to carefully manipulate the plug with said implements in order to seat the mushroom head properly against the inner wall of the tire. It was also necessary in such cases to make the seal air-tight by means of cement or other adhesive, inasmuch as no inner tube was employed in such tires. The present invention is wholly distinct from mushroom plugs intended for insertion in perforations in inner tubes, as in such cases the use of adhesive or vulcanization processes is essential and the mushroom plug is merely a specialized form of internal or external patch.

The problem of supplying a satisfactory casing repair is of wholly different character. The present practice contemplates only the repair of major punctures and quick repair of perforations of large extent have heretofore been impossible, inasmuch as vulcanization is practically the only means of supplying a permanent closure. The method and means of such casing repair embodying the principle of my invention may be used with cement or other adhesive or in connection with the vulcanization process if it is so desired, but in most instances such additional securing means will be found wholly unnecessary even with punctures of major proportions. The plugs and the stems formed thereon will, in such instances, be of suitable size for the particular opening to be sealed and an instrument for putting such plugs in place will necessarily have to be of a suitable size to co-act with the particular stem to be accommodated.

The principal object of the invention is to avoid the difficulties referred to and to provide an improved method and means for repairing the casings of automobile tires. Another object of the invention is to provide a substantially permanent repair for a hole formed by a perforating object through a tire casing by inserting the stem of a rubber or composition plug of mushroom-shape through the hole so formed and the seating of the inner face of said plug in close contact with the inner wall of the tire casing. Another object of the invention is to provide a mushroom plug having a feather edge which will closely adhere to the inner wall of the tire casing and prevent all danger of abrading or pinching action against the inner tube of the tire in the course of its deformation and flexing when in use. Another object of the invention is to provide an improved implement co-operating with a mushroom-shaped plug for spreading the walls of the opening through the casing and seating the stem of said plug therein after the withdrawal of said instrument in an outward direction through the casing opening. A further object of the invention is to provide a plug which will serve to completely seal the opening through the casing and which will so co-operate with a socket formed in the base of the instrument that the head of the plug may be used as a pad for forcing the instrument through the perforation. Other objects will appear in the course of the following description. To the accomplishment of the foregoing and related ends, said invention, then, consists of the means and method hereinafter fully described and particularly pointed out in the claims.

The annexed drawing and the following description set forth in detail certain means and one mode of carrying out the invention, such disclosed means and mode illustrating, however, but one of various ways in which the principle of the invention may be used.

Figure 2:
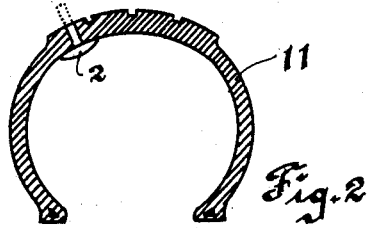
Figure 3:
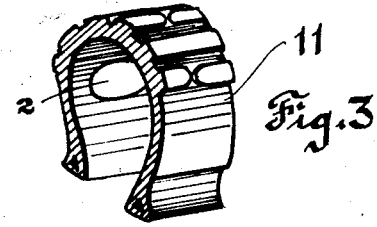
Figure 4:
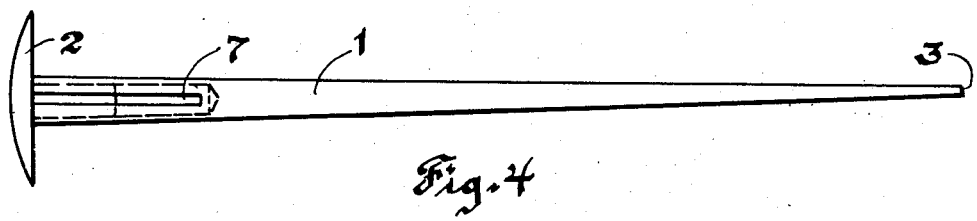
Figure 5:
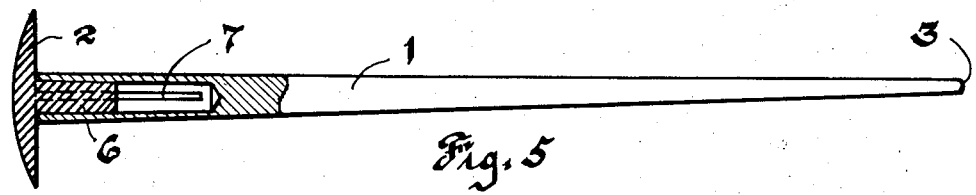
Figures 6, 7:
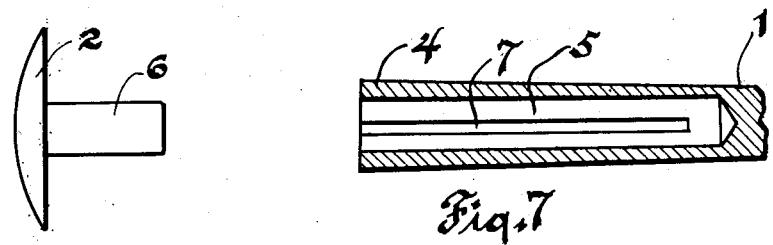

In said annexed drawing:

Fig. 1 is a perspective view showing a portion of a tire casing and the manner in which the plug and plug inserting tool are employed to seal a perforation in the tire casing; Fig. 2 is a transverse sectional view of a tire casing showing a puncture plug in position therein; Fig. 3 is a perspective view showing a portion of a tire casing with the head of a puncture plug seated against the inner wall thereof; Fig. 4 is a side elevation of a puncture sealing apparatus including a tapered plug inserting instrument and a plug telescopically engaged therewith; Fig. 5 is a view similar to Fig. 4 with the plug shown in section, as well as the lower portion of the plug inserting instrument; Fig. 6 is a side elevation of the puncture plug shown on an enlarged scale; and Fig. 7 is a longitudinal sectional view through the lower portion of the tapered plug inserting instrument showing the socket for receiving the plug stem and a sealed side thereof.

As is shown in Fig. 1 of the drawing, a casing repair is effected by means of a puncture sealing apparatus comprising a tapered plug inserting instrument 1 and a mushroom-shaped plug 2. The implement is preferably formed of metal having a highly polished exterior surface and is tapered from a small rounded nose 3 at its forward end to a widened base portion 4. The base portion preferably is provided with a socket 5 of a length adequate to receive the stem 6 of the puncture plug. In practice the socket may be formed of considerably greater length than the plug stem in order to provide a higher degree of adjustability of the lower portion of the implement to stems of a variety of sizes. Longitudinal slots 7 are preferably formed on opposite sides of the socket portion of the implement to render the same flexible and permit its removal exteriorly from the casing when the plug is inserted in position. The socket, shown in Fig. 7, is shown of even diameter throughout its length, with the side walls of said socket gradually increasing in thickness toward the base of the implement. In the form illustrated in Fig. 5 the socket walls are formed of even thickness, and in consequence the socket is slightly tapered from the base toward the narrow end of the implement.

The plug stem is preferably formed of a length to project a considerable distance through the puncture when the head of the plug is seated against the inner wall of the tire casing. This permits the stem being grasped by the fingers of the operator and the manipulation of the plug until a firm seat is secured if such further manipulation becomes necessary. The excess of stem length may be removed by cutting the stem at a point closely adjacent to the exterior surface of the casing.

While a stem of cylindrical cross-section is disclosed, it is contemplated to supply stems of various diameters and cross-sections in order that a plug of appropriate size may be utilized for insertion into an opening of elongated or irregular contour. The size of the head may also vary both in area and circumferential outline. It is very desirable, however, to have the head of each plug formed with a very thin edge, preferably a feather edge, which will merge with the adjacent inner wall of the tire casing.

When the head of the plug is seated against the inner wall of the casing, it conforms to the curvature thereof and the inner face of the head is convexly shaped to correspond. This causes the thickened head portion of the plug to flex to a slight extent and hold the marginal edges of the plug in close contact with the inner wall of the casing. Thus no obstruction interfering with the free insertion and adjustment of the inner tube within the casing is afforded and even should a casing be supplied with a plurality of puncture plugs closely juxtapositioned, no harm will result to the inner tube and as substantially satisfactory service will be rendered by the tire as though no puncture had occurred.

While the method of using the casing repair apparatus has already been indicated, it might be explained that the customary method of use is to select a plug of the proper character for the work in hand, having a stem of appropriate thickness and configuration to fill the puncture and to place such plug in the socket of the tapered plug inserting tool. The rounded nose of the tool is then inserted from within a casing 11, as is shown in Fig. 1, in the inner end of the puncture and the apparatus is forced toward the exterior of the casing, the rounded nose of the tool being permitted to find its way through the perforation without cutting away any of the puncture wall. The pressure upon the implement may be provided by the hand of the operator bearing against the head of the puncture plug until the implement projects a considerable distance through the exterior of the casing. If desired, the implement may then be grasped by means of the fingers of the operator, or pliers or a similar device, and pulled through the puncture from the outside of the casing.

During the progress of the implement through the puncture the dense slightly resilient walls of the puncture hole will be spread apart, the adjacent areas being compressed until an opening, the maximum diameter of the implement, is formed. While this operation is under way the stem of the puncture plug is being compressed, and, shielded by the resilient socket walls is drawn past the compressed area of the casing. The compressed puncture walls and plug stem are then progressively released into self-conforming interlocking relation as the implement is withdrawn. The projecting portion of the stem of the plug may then be severed at a point preferably spaced a slight distance above the exterior surface of the tire casing.

While the compressing of the torn edges of the fabric layers of the casing and of the material of the body of the stem of the puncture plug is referred to, it is to be understood that such term refers to the application of pressure upon one or more sides of the article and not upon all sides, as a solid rubber puncture plug is substantially non-compressible, like water, and the terms are used in their ordinary meaning which refers to the application of pressure to deform the adjacent parts which are merely displaced and not reduced in total bulk. The use of the term "expanding" with reference to the walls about a puncture hole likewise refers to displacement rather than change in total bulk.

While the plug is found entirely satisfactory without the use of any adhesive, cement or vulcanizing process, it is to be understood that where a cut or opening of major extent is found in the casing and it is found desirable to insure the casing wall having greater strength at the point where such cuts are made, that cementing or vulcanizing methods may be resorted to additional to those heretofore described. In the large majority of cases punctures are caused by tacks, nails and sharp pieces of glass and the perforation is of small size. Such punctures most frequently cause pinching action upon the inner tube and, in many instances, are not believed to warrant the expense and loss of time involved in resorting to vulcanization. For such repairs the puncture plug supplies immediate and permanent repair and it is unnecessary to use any secondary steps, such as cementing, to hold the same in place.

Other modes of applying the principle of my invention may be employed instead of the one explained, change being made as regards the means and the steps herein disclosed, provided those stated by any one of the following claims or their equivalents be employed.

I therefore particularly point out and distinctly claim as my invention:—

1. A method of tire casing repair which comprises the steps of spreading apart the dense slightly resilient walls of the puncture hole, shielding and compressing the stem of a tire casing repair plug and drawing the same from within said casing past the compressed walls of said puncture hole and releasing progressively into self-conforming interlocking relation the compressed wall area about the puncture hole and the compressed body of the puncture plug stem.

2. An apparatus for repairing punctures of undefined size in the casing of an automobile pneumatic tire, which comprises an elongated shaft circular in cross section having a tapered outer surface adapted to progressively compress the torn edges of the puncture walls, and acting expansively to enlarge the puncture opening to the maximum shaft diameter, a socket formed in the base of said shaft and having slitted resilient side walls, a flexible stem adapted to be telescopically engaged within said socket and compressible therein, and an enlarged head carried by said stem and adapted to form a pad for forcing said shaft through the puncture hole of said casing and cooperating as a puncture closure when said head is seated against the inner wall of said casing.

3. An instrument circular in cross section for tire casing repair having an outer surface tapering toward one end, and a compressible expansible socket at the opposite end adapted to receive a resilient stem of a tire casing repair plug, said structural elements cooperating to spread apart the dense slightly resilient walls of the puncture hole in a tire casing and to expand the same to the maximum diameter of said instrument, to shield the resilient stem of said plug as it is drawn past the compressed portion of said casing, and to release progressively into self-conforming interlocking relation the compressed wall area about the puncture hole and the compressed body of the puncture plug stem.

4. An instrument for tire casing repair having an outer surface tapering throughout substantially the entire length of said instrument toward the end, a rounded nose of smaller diameter at said end, and a socket having slitted walls at the opposite end adapted to receive a resilient stem of a tire casing repair plug, said structural elements cooperating to spread apart the dense slightly resilient walls of the puncture hole in a tire casing and to expand the same to the maximum diameter of said instrument, to shield the resilient stem of said plug as it is drawn past the compressed portion of said casing, and to release progressively into self-conforming interlocking relation the compressed wall area about the puncture hole and the compressed body of the puncture plug stem.

Signed by me, this 20th day of January, 1925.

ALBERT H. FISHER.